(12) United States Patent
Daoud

(10) Patent No.: US 7,081,576 B1
(45) Date of Patent: Jul. 25, 2006

(54) LAMINATED STRUCTURE FOR MANUFACTURE OF PERCUSSION INSTRUMENT, STRING INSTRUMENT OR FURNITURE

(75) Inventor: Sami Daoud, Bedford, NH (US)

(73) Assignee: Keller Products, Incorporated, Manchester, NH (US)

( * ) Notice: Subject to any disclaimer, the term of this patent is extended or adjusted under 35 U.S.C. 154(b) by 22 days.

(21) Appl. No.: 10/690,329

(22) Filed: Oct. 21, 2003

(51) Int. Cl.
*G10D 13/02* (2006.01)

(52) U.S. Cl. ........................ 84/411 R; 84/290

(58) Field of Classification Search .............. 84/411 R, 84/416, 291, 290; 428/40.1, 304.4
See application file for complete search history.

(56) References Cited

U.S. PATENT DOCUMENTS

| | | | |
|---|---|---|---|
| 4,144,372 A * | 3/1979 | Beck ........................ 442/104 |
| 5,333,527 A * | 8/1994 | Janes et al. .................... 84/291 |
| 5,631,097 A * | 5/1997 | Andersen et al. ........... 428/703 |
| 5,888,642 A * | 3/1999 | Meteer et al. ........... 428/313.5 |
| 6,087,568 A * | 7/2000 | Seal ............................. 84/193 |
| 6,300,551 B1 * | 10/2001 | Adinolfi ................... 84/411 R |

* cited by examiner

Primary Examiner—Kimberly Lockett
(74) Attorney, Agent, or Firm—Davis & Bujold, P.L.L.C.

(57) ABSTRACT

A cylindrical, oval or egg-shaped shell comprising a plurality of layers of wood laminate with a layer of adhesive located between each adjacent layers of wood laminate. The adhesive is a composite adhesive which has a plurality of hollow spheres intermixed within the composite adhesive to facilitate improving bonding between adjacent layers of the wood laminate. The coating of the hollow spheres is preferably silane. The laminated wood core or shell has improved strength and sound qualities and is also suitable for use in the manufacture of furniture.

20 Claims, 3 Drawing Sheets

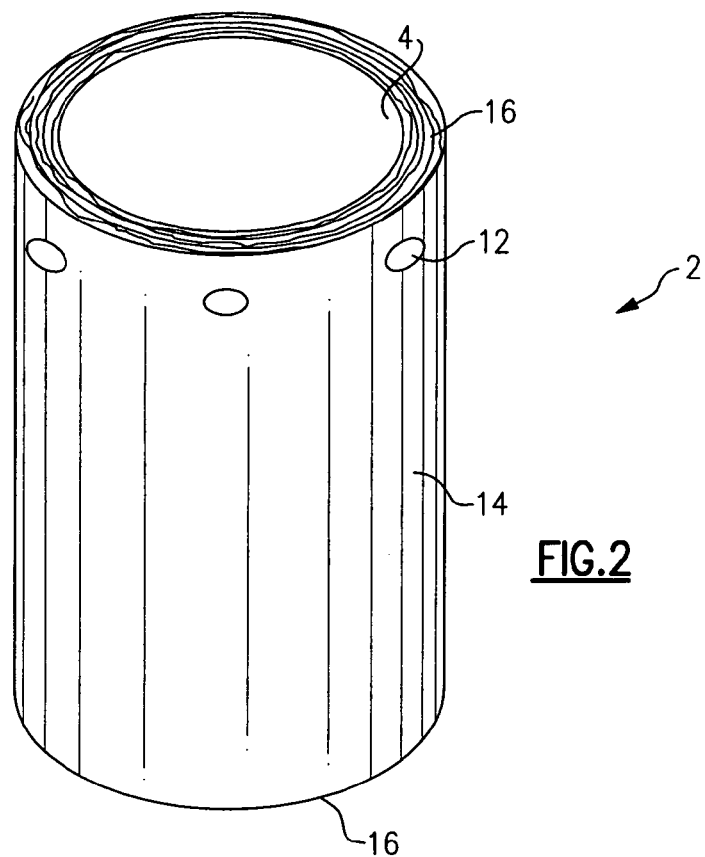
FIG.2
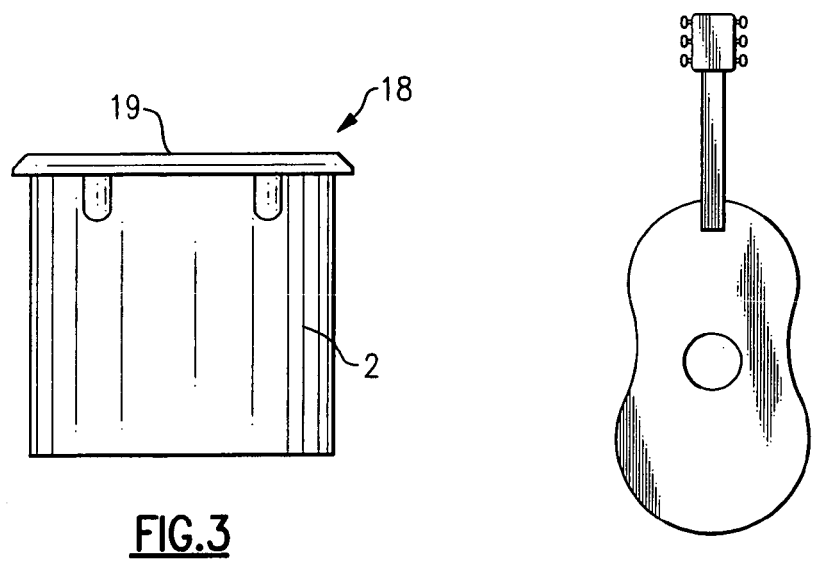
FIG.3
FIG.4

LAMINATED STRUCTURE FOR MANUFACTURE OF PERCUSSION INSTRUMENT, STRING INSTRUMENT OR FURNITURE

FIELD OF THE INVENTION

The present invention relates to improvements in acoustic resonance, sustained sound, sound amplitude, and structural integrity of laminated wood veneer structures, cores and shells. More particularly, this invention pertains to improvements for laminated wood structures, cores and shells used in manufacture of: (1) a percussion instrument, such as a drum, (2) a string instrument, such as a guitar, a violin, a harp, etc., or (3) office furniture.

BACKGROUND OF THE INVENTION

As is well known in the prior art, a structure, core or shell utilized for manufacture of a drum is typically manufactured from laminated wood, veneer, glass fiber-reinforced wood veneer composite, PVC-reinforced wood veneer composite, polyurethane-reinforced wood veneer composite, carbon fiber-reinforced wood veneer composite, phenolic- and polyamid-reinforced wood veneer composite, or possibly a molded epoxy. Regardless of how the structure, core or shell is manufactured, the physical properties and characteristics of the shell are critically important to the quality of the sound generated by the drum or other acoustic instrument manufactured from such structure, core or shell.

The acoustic instruments industry, including the drum industry, is continually striving to: (1) improve the acoustic sustained sound quality and amplitude of string instruments and drums and/or other percussion instruments; (2) reduce manufacturing and machining costs associated with production of such instruments, (3) increase strength-to-weight ratio of the instrument and/or the furniture, and (4) enhance the structural integrity of the instrument and/or the furniture.

A principal area of focus relates to the process for manufacturing the structure, core or shell. Although many known prior art structures, cores or shells are relatively strong and have relatively good sound quality, the present invention encompasses a novel approach for performance enhancement of the structure, core or shell, from an acoustic as well as structural perspective. A principal area of focus relates to the process for manufacturing the structure, core or shell.

SUMMARY OF THE INVENTION

Wherefore, it is an object of the present invention to overcome the above mentioned shortcomings and drawbacks associated with the prior art cores or shells and provide a stronger structure, core or shell having improved sound quality.

Another object of the invention is to provide a laminated wood structure, core or shell, for manufacturing a string instrument, percussion instrument or furniture, which has enhanced structural integrity, strength-to-weight ratio, and wall strength while also resulting in improved sustained sound and amplitude of the structure, core or shell.

A further object of the invention is to provide a laminated wood structure, core or shell, for manufacturing a percussion or string instrument which helps elevate head response (tone), increases drum performance (sustained sound) through use of recycled sound vibrations generated by the structure, core or shell, enhances strength-to-weight ratio of the structure, core or shell, and improves structural integrity of the structure, core or shell.

A further object of the invention is to provide a percussion instrument or string instrument with acoustic characteristics substantially identical to those of an aged percussion or string instrument. An aged instrument, as used herein, is intended to refer to an instrument being approximately between 10-years to 75-years old.

Another object of the invention is to provide a laminated wood structure, core or shell, for manufacturing a percussion instrument, string instrument, or furniture, which has an improved bonding characteristics between adjacent layers of the laminates thereby improving the overall bond strength of the laminated structure, core or shell and also facilitating easier processing, i.e., machining, shaving, drilling, sanding or other finishing of the laminated structure, core or shell. That is, the improved bonding facilitates cleaner entry and exit of drill bits and other finishing tools or devices used in the manufacture and/or finishing of the laminated wood structure, core or shell.

Another object of the invention is to provide a laminated wood structure, core or shell, for manufacturing a percussion or string instrument, which has wider, more resonant tone qualities that facilitate increasing the tuning and volume ranges of a percussion instrument manufactured from such a laminated wood core or shell.

Yet another object of the present invention is to provide a laminated wood core or shell, for manufacturing a percussion instrument, string instrument, or furniture, which has an aesthetically appealing exterior wood.

The present invention also relates to a composite structure comprising: a plurality of layers of laminate; and a layer of adhesive located between each adjacent layer of the plurality of layers of laminate; wherein the adhesive is a composite adhesive which has a plurality of hollow spheres intermixed within the composite adhesive to facilitate improving bonding between adjacent layers of the laminate.

The present invention also relates to a percussion instrument manufactured from a laminated shell in which the laminated shell comprises: a plurality of layers of wood laminate; and a layer of adhesive located between each adjacent layer of the plurality of layers of wood laminate; wherein the adhesive is a composite adhesive which has a plurality of hollow spheres intermixed within the composite adhesive to facilitate improving bonding between adjacent layers of the wood laminate; and a drum head being attached to at least one end of the laminated shell to form the percussion instrument.

As used throughout the specification and appended claims, the term "hollow sphere" means a component containing at least one internal pocket of a gas, such as air, having a diameter in the range of between about 1–2000 microns and a density in the range of between 0.01 and 2.2 g/cc, a crush strength of between 1,000 and 30,000 psi and a Moh Scale hardness of between 2 and 8. Preferably the hollow spheres are "closed cell" and not "open cell" spheres.

As used throughout the specification and appended claims, the term "sphere" means any sphere, whether a solid or substantially solid sphere without any internal pocket of a gas or a hollow sphere with at least one internal pocket of a gas.

The micro hollow spheres, intended for use in the present invention, reduce the percentage of adhesive and thereby lessen the overall weight (e.g., decrease the density) of the composite adhesive. The ductility and flexibility of composite adhesive are also reduced, i.e., the stiffness is increased, in comparison to the adhesive alone.

It is to be appreciated that the core or shell, although described below as being generally or substantially cylindrical in shape, may not have a precisely cylindrical shape or configuration. It is possible for the core or shell to be either generally or partially circular, oval or "egg-shaped," for example. Thus the term cylindrical, as used within this patent application and the appended claims, is intended to include cylindrical shapes as well as other closed shapes and configurations such as, for example, oval or "egg-shaped", hexagonal, octagonal, pentagonal, rectangular, triangular, etc.

BRIEF DESCRIPTION OF THE DRAWINGS

FIG. 2 is a diagrammatic perspective view of an improved laminated wood core or shell utilized to manufacture a percussion instrument; and FIG. 3 is a diagrammatic perspective view of a percussion instrument manufactured from the improved laminated wood core or shell according to the present invention; and FIG. 4 is a diagrammatic illustration of a stringed instrument manufactured from the laminated structure according to the present invention.

DETAILED DESCRIPTION OF THE PREFERRED EMBODIMENTS

Figure 1:
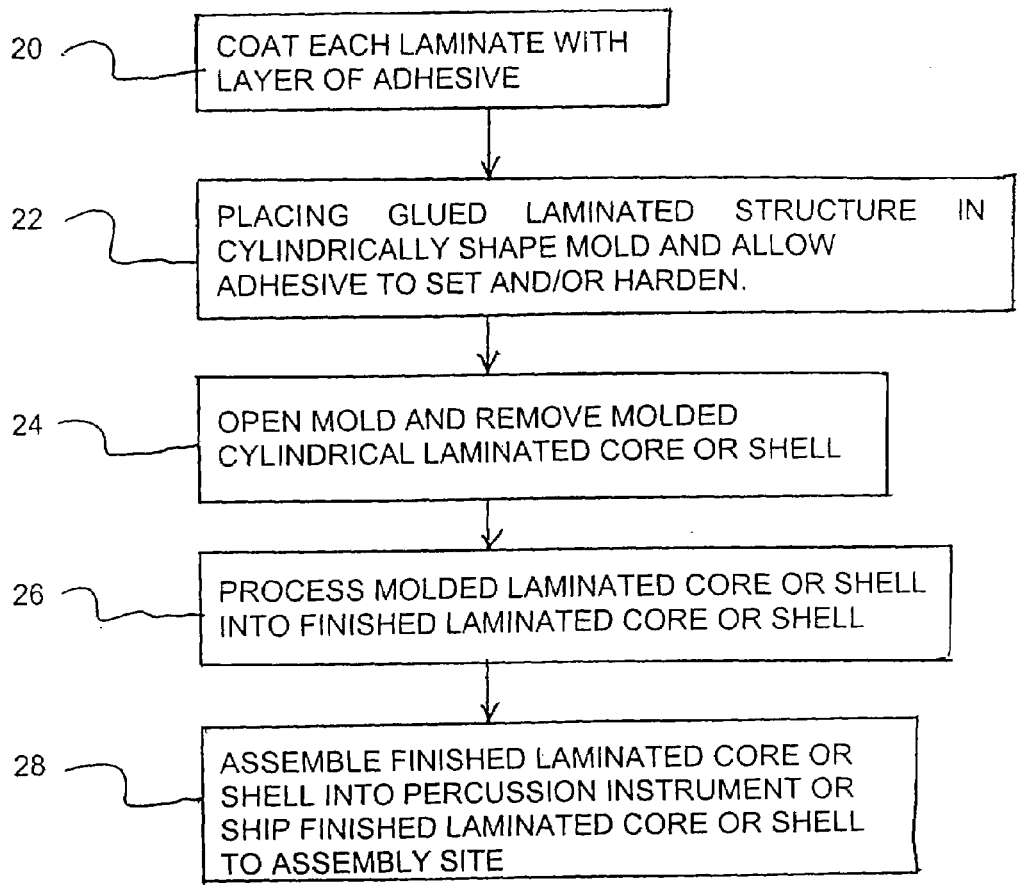
FIG. 1 is a diagrammatic flow diagram showing the prior art process for manufacturing a laminated wood structure, core or shell utilized to manufacture a percussion instrument.
Figure 1A:
FIG. 1A diagrammatic drawing showing application of the adhesive to each laminate layer.
Figure 1B:
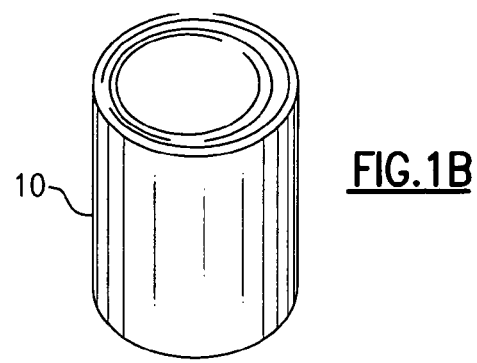
FIG. 1B diagrammatic perspective view showing a plurality of laminate layers, with the adhesive therebetween, placed within a cylindrical mold.
Figure 1C:
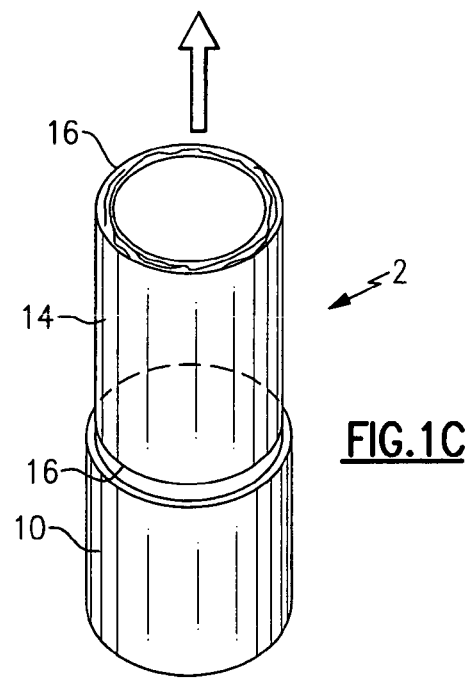
FIG. 1C diagrammatic perspective view showing removal of a molded laminated core or shell from the cylindrical mold.

Turning now to FIGS. 1–1C, a brief description concerning the various steps employed to manufacture a laminated wood structure, core or shell 2, utilized to manufacture a percussion or string instrument or furniture, will now be discussed.

The basic components utilized for manufacture of a composite structure such as a laminated structure (generally a laminated sheet of material, for example), core or shell 2 are: 1) a plurality of layers of a laminate 4, generally comprising one or more layers of wood such as maple, birch, poplar, gum, bass, mahogany, etc., and 2) a resin or adhesive 6 for bonding or gluing adjacent layers of the laminate 4 to one another. Each layer of laminate 4 typically has a wall thickness of between 0.010 and 0.250 inches, more preferably between 0.020 and 0.150 inches while each laminated structure, core or shell 2 typically comprises, for example, between two to about twenty laminated layers, preferably, either six, eight or ten layers of laminate 4.

With respect to the layers of laminate forming the laminated structure, core or shell 2, it is to be appreciated that each laminate layer can comprise one or more layers of the same material or one or more layers of a variety of different materials which are all adhesively secured to one another to form the layer of laminate. As the formation of the laminate layers is conventional and well known in the art, a further detail discussion concerning the same is not provided.

The resulting laminated structure, core or shell 2 either comprises a plurality of layers of the same or similar material or a plurality of layers of different materials. For example, one or more laminate layers can be a first material while one or more laminate layers can be a second material. Alternatively, one or more laminate layers can be a first material with one or more laminate layers being a second material and one or more laminate layers being a third material, etc. It is to be appreciated that there are countless possible arrangements which would be readily apparent to those skilled in this art.

While a wood laminate may be desirable, it is possible that one or more layers of the laminate of the laminated structure, core or shell 2 could be, for example, a layer of natural or synthetic cloth, a layer of fiberglass or some other mat, a woven or nonwoven material, some conventional synthetic layer or material, a layer of metal (such as perforated aluminum), a layer of plastic, or some other conventional or well known relatively thin layer of material.

With respect to a drum or other percussion instrument, the inventor determined that utilization of a birch laminate, as the inwardly facing layer of the cylindrical core or shell 2, tends to improve the tonal qualities of a drum or other percussion instrument manufactured from such cylindrical core or shell 2.

The important qualities of the laminated structure, core or shell 2 are generally the tone, (2) the sound decay time period, (3) the amplitude, and (4) the frequency. These qualities can be readily modified or adjusted to suit a particular application. For example, one application may desire a shorter sound decay while another application may desire a longer sound decay. Alternatively, one application may desire an increase in either amplitude and/or frequency while another application may desire a decreased in either amplitude and/or frequency. By appropriately selecting the hollow spheres, the type of adhesive, the ratio of the hollow sphere to the adhesive, whether or not the hollow spheres are coated with a coupling agent, the type of coupling agent, etc., as well as other manufacturing or process parameters for forming the composite adhesive, various modifications in the sound and tonal qualities of the laminated structure, core or shell 2 can be readily achieved. That is, it is relatively easy to design a drum for a "hard rock" application to suit a particular requirement which can have quite different sound qualities than, for example, a drum for a "jazz" or a "blues" application.

It is also possible to utilize the laminated structure for the manufacture of a stringed instrument, such as a guitar, a violin, a harp, etc. The laminated structure can then be either cut into a desired stringed instrument profile and/or can be shaped or placed in a mold and molded into the desired shape and/or configuration of the stringed instrument to be manufactured (see FIG. 4). In particular, the laminated structure may be used to form the body of a guitar, a violin, a viola, cello, etc., or could also be utilized to manufacture the neck of such stringed instruments.

As is conventional in the art, the first step 20 in manufacturing the I laminated structure involves placing a first laminate 4, e.g., a wood laminate, on a table or other support surface 8 (see FIGS. 1 and 1A) and then spreading a thin layer of the adhesive 6 over the entire upwardly facing top surface 10 of the first laminate 4. Thereafter, a second laminate 4', e.g., another laminate, is placed over the adhesive layer 6 applied to the first laminate 4 and then a thin a layer of the adhesive 6' is applied or spread over the entire upwardly facing top surface of the second laminate 4'. This process is repeated until a sufficient amount of layers of laminate, for formation of the desired laminated wood structure, core or shell 2, are achieved.

The next step 22 involves placing the laminate layers 4, 4', with the adhesive 6, 6' (see FIGS. 1 and 1B) between each adjacent layer of laminate into a cylindrical shape mold and allowing the adhesive a sufficient amount of time to cure, set and/or harden. It is to be appreciated that there are a variety of conventional processes and techniques for forming or molding the plurality of layers of the laminates into a cylindrical, or substantially cylindrical shape, which are conventional and well known in the art. As such, a further detail discussion concerning the same is not provided.

It is to be appreciated, that the setting and/or hardening time and/or other drying or curing parameters for the adhesive will depend upon the particular adhesive employed. For example, if a conventional white glue adhesive is utilized, heat is not required but the setting and/or hardening time for white glue tends to be quite long, e.g., several hours or so since such glue will naturally set over time. Alternatively, if a heat activated adhesive is employed, such as urea formaldehyde for example, the plurality of layers of the laminates 4 may be placed in a cylindrical mold 10 which is subsequently heated to activate and cure the adhesive. The heat speeds up the curing, setting and/or hardening time for such adhesive.

After the adhesive has been allowed to sufficiently set and/or harden, at step 24, the mold is opened and the molded cylindrical laminated core or shell 2 is removed therefrom. In some applications, where a substantially flat laminated structure is desired, the plurality of layers of laminates 4, 4'/adhesive 6, 6' may be placed in a flat press and heated or allow to set naturally over time, for example.

At step 26, the molded cylindrical laminated structure, core or shell 2 is then processed into a finished laminated structure, core or shell 2 or cut or molded into a desire shape or configuration. This typically involves trimming or cutting the molded cylindrical laminated structure, core or shell 2 to a desired length or possibly a desired shape. This may also involve sanding of the molded cylindrical laminated structure, core or shell 2 and possibly machining one or more bores, slots, holes, apertures, openings 12, etc., in a wall 14 of the laminated structure, core or shell 2 and/or machining, chamfering, tapering, etc., the opposed circumferential edges 16 of the laminated structure, core or shell 2.

Finally, at step 28, the finished laminated structure, core or shell 2 may then either be assembled into a drum or some other percussion instrument 18 by securing a drum head 19 on top of the laminated wood core or shell 2 or, alternatively, may be shipped to an assembly area or some other assembly site where the finished laminated structure, core or shell 2 is finally assembled into a drum, some other percussion instrument. Alternatively, the finished laminated structure, core or shell 2 may then be either used to manufacture a string instrument, a table, a chair, or some other piece of furniture in a conventional manner.

Although the sanding operation is indicated as typically occurring during the finishing step of the laminated structure, core or shell 2, it is to be appreciated that a sanding operation may occur at various times during manufacture of the laminated structure, core or shell 2. As will be appreciated by those skilled in the art that the number of different sanding operations, the grit of sand paper employed during such sanding operation(s) and/or the duration of the sanding operation(s) will vary depend on the specific requirements of the structure, core or shell 2 to be manufactured.

The inventor has determined that by modifying the adhesive applied between the adjacent layers of the laminate 4 to include a plurality of hollow spheres, preferably coupling agent-coated hollow spheres, the sound quality of a string instrument, drum or other percussion instrument, manufactured from the laminated structure, core or shell 2, can be significantly improved.

EXAMPLE #1

Five conventional or standard drum shells ("STANDARD DRUM SHELLS") were tested relative to five similar drum shells manufactured in accordance with the teaching of the present invention ("VSS DRUM SHELLS"). Testing of these ten (10) drum shells was carried out using a microphone with a pressure transducer and an M-Box Data Acquisition System. The data was collected and analyzed using Pro Tools 5.3.3 Software. For both types of musical drum shells, the only difference is that the standard drum shells merely employed an adhesive for bonding the individual wood layers to one another and forming the drum shell while the VSS drum shells had a hollow sphere additive incorporated within the adhesive for bonding the individual wood layers to one another and forming the VSS drum shell. The resulting data was compiled and is presented in Table I below.

Three principal parameters were measured for both types of drum shells, namely, Decay Time (sec), Frequency (Hz) and Relative Amplitude (%).

TABLE I

| | VSS DRUM SHELLS | | | STANDARD DRUM SHELLS | | |
|---|---|---|---|---|---|---|
| DRUM SIZE | Decay Time, Seconds | Frequency, Hz | Amplitude % | Decay Time, Seconds | Frequency, HZ | Amplitude % |
| 8 × 10 | 1.729 | 200 | 100 | 1.613 | 250 | 75 |
| 8 × 12 | 1.105 | 200 | 75 | 1.095 | 200 | 75 |
| 14 × 14 | 1.4195 | 167 | 100 | 0.940 | 250 | 80 |
| 16 × 20 | 1.875 | 167 | 100 | 1.440 | 200 | 90 |
| 5.5 × 14 | 0.781 | 200 | 100 | 0.312 | 200 | 90 |

As can be seen from the test results of Table I, it is readily apparent that a significant increase in sustained sound (acoustic resonance) as well as the energy (amplitude or tone) is achieved by the drum shells manufactured in accordance with the teachings of the present invention. As noted from the above data, significant differences in the acoustical performance arise between a drum shell manufactured according to the teachings of the present invention and a standard drum shell. In particular, there are significant differences in the sustained sound (acoustic resonance which is expressed in terms of decay time) as well as the amplitude (which is expressed in terms of energy versus pressure and sometimes referred to as tone). As is readily apparent from Table I, the amplitude is significantly higher for a drum shell manufactured according with the teachings of the present invention, typically by a range of 11 to 33%, in comparison with the amplitude of a conventional standard drum shell. With respect to frequency, the frequency for a conventional standard drum shell is either equal to or higher than the frequency for a drum shell manufactured according to the teachings of the present invention. This difference is believed to be due to the wave length being slightly shorter in the case of a standard drum shell which may be due to calibration techniques in the drum shell.

EXAMPLE #2

A further test was conducted with respect to white-covered, vintage series (maple and poplar) 6-ply, and nonreinforced drum shells. Five baseline standard drum shells ("STANDARD DRUM SHELLS") were tested against five similar size VSS drum shells ("VSS DRUM SHELLS"). Testing was carried out using a microphone with a pressure transducer and an M-Box Data Acquisition System. The data was collected and analyzed using Pro Tools 5.3.3 Software. For both types of musical drum shells, the only difference is that the standard drum shells merely employed an adhesive for bonding the individual wood layers to one another and forming the drum shell while the white-covered, vintage series drum shells had a hollow sphere additive, one which enhances acoustic resonance (sustained sound), incorporated within the adhesive for bonding the individual wood layers to one another and forming the VSS drum shell. The resulting data was compiled and is presented in Table II below.

For each test, three principal parameters were measure for each drum shell, namely, Decay Time, Frequency and Relative Amplitude. The results are summarized in Table II below.

TABLE II

| | VSS DRUM SHELLS | | | STANDARD DRUM SHELLS | | |
|---|---|---|---|---|---|---|
| DRUM SIZE | Decay Time, Seconds | Frequency, Hz | Amplitude % | Decay Time, Seconds | Frequency, HZ | Amplitude % |
| 8 × 10 | 2.086 | 333 | 100 | 1.173 | 250 | 75 |
| 8 × 12 | 1.486 | 250 | 100 | 0.949 | 200 | 80 |
| 14 × 14 | 2.217 | 143 | 100 | 1.732 | 111 | 78 |
| 16 × 20 | 1.945 | 500 | 65 | 1.324 | 167 | 33 |
| 6.5 × 14 | 1.383 | 333 | 75 | 0.973 | 200 | 60 | shell and the VSS drum shell. In particular, all different sizes of the VSS drum shells appear to be significantly higher in sustained sound (acoustic resonance) expressed in terms of time decay (seconds); and in amplitude expressed in terms of energy/pressure, or sometimes referred to as tone. Based on the aforementioned test results, a significant difference exists between the standard drum shells and VSS drum shells, with the VSS drum shells being significantly better (i.e., significantly higher in sustained sound and tone).

EXAMPLE #3

An third test was conducted for a (1) 6-ply mahogany-poplar with 10-ply reinforced shell; and (2) a tone-matched kit. Five baseline drum shells ("STANDARD DRUM SHELLS") were tested against nine similar in size VSS drum shells ("VSS DRUM SHELLS")—both mahogany and tone-matched drum shells. Testing was carrier out using a microphone with a pressure transducer and an M-Box Data Acquisition System. Data were collected and analyzed using Pro Tools 5.3.3 Software. For both types of musical drum shells, the only difference is that the standard drum shells merely employed an adhesive for bonding the individual wood layers to one another and forming the drum shell while the VSS drum shells had a hollow sphere additive, one which enhances acoustic resonance (sustained sound), incorporated within the adhesive for bonding the individual wood layers to one another and forming the VSS drum shell. The resulting data was compiled and is presented in Table III below.

For each test, three principal parameters were measure for each drum shell, namely, Decay Time (sec), Frequency (Hz) and Relative Amplitude (%). The results are summarized in Table III below.

TABLE III

| | VSS DRUM SHELLS | | | STANDARD DRUM SHELLS | | |
|---|---|---|---|---|---|---|
| DRUM SIZE | Decay Time, Seconds | Frequency, Hz | Amplitude % | Decay Time, Seconds | Frequency, Hz | Amplitude % |
| MAHOGANY | | | | | | |
| 5 × 14 | 0.771 | 333 | 100 | 0.305 | 250 | 75.1 |
| 8 × 12 | 1.703 | 333 | 100 | 1.529 | 333 | 100 |
| 9 × 13 | 3.647 | 250 | 100 | 2.328 | 250 | 100 |
| 14 × 22 | 0.918 | 200 | 100 | — | — | — |
| 16 × 16 | 3.959 | 200 | 100 | 2.775 | 200 | 100 |
| TONE-MATCHED KIT | | | | | | |
| 5 × 14 Maple | 1.075 | 200 | — | — | — | — |
| 8 × 10 Walnut | 1.959 | 250 | — | — | — | — |
| 14 × 14 Birch | 4.220 | 100 | — | — | — | — |
| 8 × 12 Cherry | 2.034 | 333 | — | — | — | — |

The compiled results show a significant increase in sustained sound (acoustic resonance) in the VSS drum shells (28% higher for 14×14 VSS; 47% higher for 16×20 VSS; 57% higher for 8×12 VSS; 78% higher for 8×10 VSS; and 42% higher for 6.5×14). Additionally, a significant increase in the energy (amplitude or tone) was realized in the VSS drum shells.

Data collected in Table II for the white-covered vintage series drum shells show a significant difference in acoustic performance (sustained sound) between the standard drum For the mahogany-poplar series, the results show a significant increase in sustained sound (acoustic resonance) in the VSS drum shells over the baseline drum shells (153% higher for 5×14 VSS; 11% higher for 8×12 VSS; 57% higher for 9×13 VSS; 43% higher for 16×16 VSS). Additionally, a comparable or better increase in the energy (amplitude or tone) was detected. For the tone-matched kit, baseline testing was not performed, interestingly however, the size 14×14 birch type drum shell had a 90% sustained sound improvement over the white-covered vintage series VSS drum shell of similar size, 39% increase in sustained sound of size 5×14 Maple over the 5×14 mahogany series, and 33% sustained sound improvement of size 8×12 cherry over the mahogany drum shell. The aforementioned results suggest a significant performance improvement in all VSS-type drum shells.

The collected date in Table III for the mahogany-poplar series drum shells and the tone-matched kit series drum shells show a significant difference in acoustic performance (sustained sound) between the baseline standard drum shell and the VSS drum shells. In particular, all of the different sizes of the VSS drum shells appear to be significantly higher in sustained sound (acoustic resonance), expressed in terms of time decay (seconds) and in amplitude expressed in terms of energy/pressure, or sometimes referred to as tone.

The above improvements are all believed to be a direct result of the adhesive modification of the present invention. According to the present invention, a colloidal suspension of micro-size hollow spheres, nano-size hollow spheres, or elemental nano-tubes is prepared in the resin/adhesive system. The additive is uniformly dispersed in the conventional adhesive to form a composite adhesive which is applied between each adjacent layer of the laminate 4. The added spheres must be micron-size or nano-size hollow spheres, and can be, for example, glass spheres, ceramic spheres, polymeric spheres or metallic spheres.

The hollow spheres are typically spherical, or substantially spherical, in shape. Preferably, the hollow spheres have a particle size of between 1 and 2000 microns, more preferably have a particle size of between about 8 and 125 microns, and most preferably have a particle size of between about 11 and 88 microns. The density of the hollow spheres preferably ranges between 0.01 and 2.2 g/cc, more preferably the density ranges between 0.15 and 0.60 g/cc, and most preferably the density ranges between 0.187 and 0.39 g/cc.

Preferably, the hollow spheres have a hardness (on the Moh's Scale) of between 2 and 8, more preferably have a hardness (on the Moh's Scale) of between about 5 and 6, and most preferably have a hardness (on the Moh's Scale) of between about 5.5 and 6.0. The crush strength of the hollow spheres preferably ranges between 1000 and 19,000 psi, more preferably the crush strength ranges between 7,500 and 17,000 psi, and most preferably the crush strength ranges between 10,000 and 15,000 psi. The above indicated parameters of the hollow spheres are believed to be important but it is to be appreciated that other characteristics and/or properties of the hollow spheres may also have an impact on improving the sound, tone and structural integrity of the laminated structure, core or shell 2.

The hollow spheres are typically coated with a coupling agent. The inventor discovered that if the hollow spheres are coated with a suitable coupling agent, the coupling agent coating promotes a more intimate filling of the micro voids of the wood veneer or laminate so that, upon the adhesive curing (under heat and pressure), setting or hardening of the resin/adhesive, stronger covalent bonds are formed between the resin/adhesive and the surface of the glass, ceramic, polymeric or metallic spheres. As a result of this, a significant improvement in the bond strength between the resin/adhesive and the hollow spheres located within the interstitial grain structure of the wood veneer or laminates is attained. That is, the coupling agent is believed to increase and/or improve the bond strength between the adhesive and the surface of the hollow spheres and between the adhesive and the laminate. This, in turn, results in a noticeable enhancement in the structural integrity and marked improvements in sustained sound and sound quality for the laminated structure, core or shell 2. The inventor believes that the laminated structure, core or shell 2, manufactured according to the present invention, immediately following manufacture thereof has a sound quality substantially equal to that of a conventional laminated wood structure, core or shell 2 which has been aged for a period of ten to seventy five years.

A preferred coupling agent, for the hollow spheres, is a gamma-aminopropyltriethoxysilane coupling agent having the following formula $(NH_2(CH_2)_3Si(OC_2H_5))_3$. Preferably, the hollow spheres are coated such that the coupling agent comprises a coating which ranges in concentration from about 0.01% to 5% by weight of the hollow spheres. The hollow spheres comprise a concentration of 2% to 45% of the weight of the resin or adhesive, more preferably the hollow spheres comprise a concentration of 5% to 15% of the weight of the resin or adhesive, and most preferably the hollow spheres comprise a concentration of 7% of the weight of the resin or adhesive.

In this invention, a silane coupling agent having the generic structure Y—R—Si—X3 is incorporated to the adhesive via the use of hollow spheres which, in essence, function as a filler. In the above formula, X is a hydrolysable alkoxy group (methoxy, ethoxy, or acetoxy) and Y an organofunctional group (amino-, vinyl-, epoxy-, methacryl- etc.) attached to the silicon by an alkyl bridge, R. The alkoxy groups are able to react with the surface groups of many inorganic types of fillers. They first react with water to produce the silane triol and release alcohol as a by-product. The silanol groups then believed to condense with the oxide or hydroxyl groups on the surface of the filler.

Hydrolysis Reaction

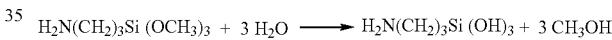

Bond Formation to the Substrate

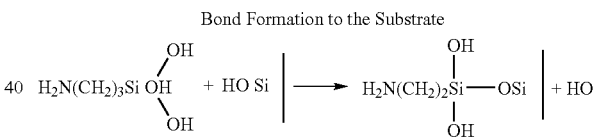

Polysiloxane Formation

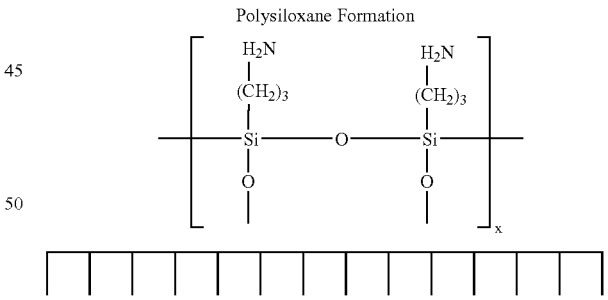

Neighboring siloxane chains can interact to produce a polysiloxane layer at the surface. Silanes require active sites, preferably hydroxyl groups on the surface of the filler (i.e., the hollow spheres), for the reaction to occur. They can, therefore, be used to treat all silicate-type fillers, inorganic metal oxides and hydroxides. Once coupled at the filler interface, the reactive Y component allows bonding to the polymer matrix by a chemical reaction (e.g., grafting, addition, substitution) with the active groups on the polymer and/or by physicochemical interactions. The Y groups are selected to maximize compatibility with particular resin or adhesive formulations. For example, amin-functional silanes are more applicable for use in polyamids, polycarbonate, epoxys, urethanes, and urea formaldehyde, for example. In one embodiment of the invention, the amino silane functional group is further used as a surface modified for urea formaldehyde to provide improved dispersion, and to reduce the viscosity and water absorption. The superior bonding with the composite adhesive typically enhances mechanical and electrical properties, reduces shrinkage, increases dimensional stability and weather resistance, and lessens or eliminates surface or internal defects thereby improving the surface appearance of the drum shell.

Virtually any conventional and/or well known resin or adhesive may be combined with the hollow spheres to form the composite adhesive. For example, urea formaldehyde adhesive or some another conventional heat activated resin or adhesive may be employed. Alternatively, a moisture cured urethane, a conventional glue, an epoxy, a paste, etc., may be utilized as the adhesive. As those skilled in the art will appreciate, the specifically selected resin or adhesive is directly dependent upon the composition of the laminate materials as well as the specific manufacturing process employed for fabrication of the laminated structure, core or shell 2. When preparing the composite adhesive, a mixture is prepared which typically comprises about 1% to 40% of uncoated or coated hollow spheres and about 60% to 99% of the adhesive, more preferably the composite adhesive comprises a mixture of about 2% to 20% of the uncoated or coated hollow spheres and about 80% to 98% of the adhesive, and still more preferably the composite adhesive comprises a mixture of about 3% to 10% of the uncoated or coated hollow spheres and about 90% to 97% of the adhesive.

Once a desired amount of the uncoated or coated hollow spheres and the adhesive are combined with one another in the desired ratio, these two components are then thoroughly mixed with one another to form a uniform mixture of the composite adhesive. Following a thorough mixing of the composite adhesive for a period of less than twenty (20) minutes, e.g., 3–5 minutes (for KP mix size), the composite adhesive is then ready for use. As with the prior art manufacturing process, the composite adhesive is applied between adjacent layers of laminate 4. The composite adhesive is applied or spread over the entire top upwardly facing surface of the laminate 4 to have a thickness typically ranging from about one mil to about 20 mils or so, more preferably ranging from about 5 mils to about 10 mils, most preferably the applied composite adhesive layer has a thickness of about 7 mils.

As with the prior art manufacturing process, the adhesive layers are then allowed to cure, set and/or harden, in a cylindrical mold or are cut, formed or molded into a desired shape or configuration. Following cutting, shaping, molding, etc., the molded laminated structure, core or shell 2 is then subjected to a conventional finishing process which is discussed above in further detail.

The hollow spheres were found to improve the sound quality for a drum or other percussion instrument or a string instrument manufactured from the structure, shell or core 2, according to the present invention, due to the hollow nature of the spheres. The inventor believes that the hollow spheres help regenerate and reverberate the sound when a finished drum, or other percussion instrument, is struck by a drum stick, for example, or a string instrument is played. This helps to increase the k-time of the generated sound. The hollow spheres are also believed to impregnate the pores and voids of the wood laminate and this results in an improved bonding of the adhesive with the wood laminate thereby resulting in a stronger structure, core or shell 2. Furthermore, when hollow spheres are introduced into a matrix of a wood laminate, they tend to relieve and/or distribute stress more evenly throughout the entire laminate. As a result, machinability of the structure, core or shell 2 is enhanced, due to the absence of localized stress (thermal and mechanical) points. Surface roughness, following machining, is also eliminated, due to their submicron geometrical size.

Since certain changes may be made in the above described improved laminated wood core or shell, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A composite structure comprising:
   at least a first layer of laminate, a second layer of laminate and a third layer of laminate; and
   an adhesive layer located between the first and the second layers of laminate and between the second and the third layers of laminate;
   wherein the adhesive layer, located between the first and the second layers of laminate and between the second and the third layers of laminate, is a colloidal composite adhesive which has a plurality of hollow spheres intermixed within the composite adhesive to facilitate improving bonding between adjacent layers of the laminate, and all of the hollow spheres in the composite adhesive have a diameter of less than 500 microns.

2. The composite structure according to claim 1, wherein the hollow spheres are coated with a coupling agent and the coated hollow spheres are approximately between 5 and 300 microns in size.

3. The composite structure according to claim 2, wherein the coupling agent is a silane coupling agent.

4. The composite structure according to claim 1, wherein the composite structure is a laminated shell which is used for manufacture of one of a percussion instrument and a piece of furniture.

5. The composite structure according to claim 1, wherein the composite structure is a laminated sheet of material which is used for manufacture of at least one component of a string instrument.

6. The composite structure according to claim 1, wherein the composite adhesive comprises a mixture of between 1% to 40% of the hollow spheres and 60% to 99% of the adhesive.

7. The composite structure according to claim 1, wherein a thickness of the composite adhesive, applied between adjacent layers of the laminate, is between 1 and 20 mils thick.

8. The composite structure according to claim 1, wherein each layer of the plurality of layers of laminate has a thickness of between 0.010 and 0.250 of an inch.

9. The composite structure according to claim 1, wherein the composite structure has between 3 and 20 layers of laminate.

10. The composite structure according to claim 1, wherein at least one the plurality of layers of laminate is a layer of one of a maple laminate, a birch laminate, a poplar laminate, a gum laminate, a bass laminate and a mahogany laminate.

11. A composite structure comprising:
    a plurality of layers of laminate with at least one layer being a wood laminate; and a layer of adhesive located between each adjacent layer of the plurality of layers of laminate;

wherein the adhesive is a colloidal composite adhesive which has a plurality of hollow spheres coated with a trialkoxysilane coupling agent and uniformly intermixed within the composite adhesive to facilitate improving bonding between adjacent layers of the wood laminate, the coated hollow spheres being approximately between 5 and 300 microns in size, and the composite adhesive having a ratio of approximately 60–99% adhesive to 1–40% coated hollow spheres.

12. The composite structure according to claim 11, wherein the trialkoxysilane coupling agent is a gamma-aminopropyltriethoxysilane coupling agent comprises from about 0.01% to 20% of a coated hollow sphere formulation while the hollow spheres comprise from about 80% to 99.99% of the coated hollow sphere formulation.

13. The composite structure according to claim 11, wherein the composite structure is a laminated shell which is used for manufacture of one of a percussion instrument and a piece of furniture.

14. The composite structure according to claim 11, wherein the composite structure comprises a plurality of cellulose based layers and a colloidal dispersion of an interpenetrating network of the plurality of hollow spheres of micron and sub-micron size in a resin matrix.

15. The composite structure according to claim 11, wherein the composite adhesive comprises a mixture of between 3–10% of the hollow spheres and 90–97% of the adhesive.

16. The composite structure according to claim 11, wherein a thickness of the composite adhesive, applied between adjacent layers of the laminate, is between 1 and 20 mils thick.

17. The composite structure according to claim 11, wherein each layer of the plurality of layers of laminate has a thickness of between 0.010 and 0.250 of an inch.

18. The composite structure according to claim 11, wherein the composite structure has between 2 and 20 layers of laminate and at least one the plurality of layers of laminate is a layer of one of a maple laminate, a birch laminate, a poplar laminate, a gum laminate, a bass laminate and a mahogany laminate.

19. A percussion instrument manufactured from a laminated shell in which the laminated shell comprises:

a plurality of layers of wood laminate; and a layer of adhesive, having a thickness of approximately 7 mils, located between each adjacent layer of the plurality of layers of wood laminate;

wherein the adhesive is a colloidal composite adhesive which has a plurality of hollow spheres, coated with a gamma-aminopropyltriethoxysilane coupling agent and intermixed within the composite adhesive to facilitate improving bonding between adjacent layers of the wood laminate, the coated hollow spheres being approximately between 11 and 88 microns in size, a density of approximately between 0.187 and 0.39 g/cc, a hardness of approximately between 5.5 and 6.0 on the Moh's scale of hardness, and a crush strength of approximately between 10,000 and 15,000 psi, and the composite adhesive having a ratio of approximately 90–97% adhesive to 3–10% coated hollow spheres; and a drum head being attached to at least one end of the laminated shell to form the percussion instrument.

20. The percussion instrument according to claim 19, wherein the percussion instrument has at least one of an improved acoustic resonance, an improved sustained sound, and an improved sound amplitude.

* * * * *